United States Patent [19]

Skjaeveland et al.

[11] Patent Number: 5,701,960
[45] Date of Patent: Dec. 30, 1997

[54] REVERSIBLE PLOUGH

[75] Inventors: Magne Skjaeveland, Klepp stajon; Kjell-Egil Stangeland, Klepp, both of Norway

[73] Assignee: Kverneland Klepp AS, Kverneland, Norway

[21] Appl. No.: 759,749

[22] Filed: Dec. 3, 1996

Related U.S. Application Data

[63] Continuation-in-part of Ser. No. 393,000, filed as PCT/GB94/01476, Jul. 7, 1994, abandoned.

[30] Foreign Application Priority Data

| Jul. 10, 1993 | [GB] | United Kingdom | 9314304 |
| Oct. 12, 1993 | [GB] | United Kingdom | 9321015 |

[51] Int. Cl.⁶ .................................................. A01B 17/00
[52] U.S. Cl. ....................................... 172/219; 172/225
[58] Field of Search ............................ 111/52, 136, 140, 111/152, 186, 527; 172/162, 212, 219, 204, 224, 225, 271, 311, 427, 459, 772

[56] References Cited

U.S. PATENT DOCUMENTS

| 2,644,385 | 7/1953 | Brown | 172/225 |
| 3,810,434 | 5/1974 | van der Lely et al. | 111/9 |
| 4,042,253 | 8/1977 | Watts | 172/224 |
| 4,592,429 | 6/1986 | Watts | 172/226 X |
| 4,691,785 | 9/1987 | Post | 172/225 X |
| 4,778,013 | 10/1988 | Van der Lely | 172/225 |
| 4,896,731 | 1/1990 | Besson | 172/225 |
| 5,590,722 | 1/1997 | Torgrimsen | 172/219 |
| 5,603,381 | 2/1997 | Torgrimsen | 172/225 X |

FOREIGN PATENT DOCUMENTS

| 0198563 | 11/1986 | European Pat. Off. |
| 2028409 | 10/1970 | France |
| 1122310 | 1/1962 | Germany |
| 3333748 | 4/1985 | Germany |
| WO 93/17541 | 9/1993 | WIPO |

Primary Examiner—Terry Lee Melius
Assistant Examiner—Robert Pezzuto
Attorney, Agent, or Firm—Workman, Nydegger & Seeley

[57] ABSTRACT

A reversible plough, that in one embodiment is of the semi-mounted type, and comprises a main beam, a coupling structure at the forward end of the main beam, and a carrying beam. Pairs of plough bodies are mounted along the length of the carrying beam. The carrying beam is pivotably connected to the main beam to move between a first and a second ploughing position for plough body reversal. The reversible plough further includes a coupling beam that is secured to the carrying beam, and a soil preparation device such as a packer that prepares the soil turned over by the plough bodies for seed. The coupling beam projects laterally from the coupling beam in either ploughing position and is moveable with the carrying beam during plough body reversal. A hopper is mounted at a fixed location relative to the packer and the reversible plough combination, and a distributor is mounted on the packer and arranged to distribute the hopper content onto the ground. The hopper contents are conveyed by a flexible distribution system that includes a line extending between the hopper and the distributor.

18 Claims, 5 Drawing Sheets

REVERSIBLE PLOUGH

RELATED APPLICATIONS

This application is a continuation-in-part application of U.S. patent application Ser. No. 393,000 that was filed as PCT/GB94/01476, Jul. 7, 1994, now abandoned.

BACKGROUND OF THE INVENTION

1. The Field of the Invention

This invention relates to a reversible plough which is adapted to be towed behind a tractor or other propelling vehicle and which comprises a main beam, coupling means at the forward end of the main beam to couple the plough to the rear of the propelling vehicle, and a carrying beam having pairs of plough bodies mounted along its length and pivotally connected to the main beam for movement between first and second ploughing positions, in one of which one plough body of each pair is in a ploughing position and in the other of which the other plough body of each pair is in the ploughing position.

2. Background Art

Reversible ploughs are usually (1) of the fully mounted type, in which the major part of the weight of the plough is borne by the rear lift mechanism of a tractor, or (2) of the semi-mounted type in which the weight of the forward part only of the plough is borne by the rear lift mechanism, whereas the rear part of the plough is supported by one or more ground wheel.

The present invention has been developed primarily in connection with a reversible plough of the semi-mounted type, and the preferred embodiment which will be described with reference to the accompanying drawings is also of this type. However, it should be understood that the invention is not restricted solely to a plough of the semi-mounted type, and may be applied also to a fully mounted reversible plough.

Semi-mounted ploughs often are of substantial length, so that a considerable number of furrows can be ploughed during each pass along the field, and to further increase the number of furrows, the plough may have a forward section coupled directly to the rear of the tractor, and a rear section coupled with the forward section and carrying a further set of reversible plough bodies, and the arrangement is such that both the forward section and the rear section can undergo joint movement during each reversal of the plough.

It is also known to use soil preparation devices, such as harrows and packers, to break down the soil turned over during ploughing, and this can take place either (1) as a separate operation after ploughing has been completed or (2) simultaneously with the ploughing operation in the case of plough/soil preparation combinations.

Packers are often used in plough/packer combinations, and comprise heavy packer wheels arranged in sets, or toothed rolls, and these are heavy and robustly constructed, comprising rolling masses of high inertia so as to exert a sufficient crumbling force to break down clods of soil to form a seed bed.

Until recently, packers of plough/packer combinations have generally been releasably coupled to the associated plough frame, and are released at the end of each pass along a field, and are only recoupled after the tractor/plough combination has turned round, and also reversed the plough bodies ready for a return pass. This has been necessary because suitable couplings had not been developed to allow the packers to remain coupled with the plough frame during the necessary maneuvers which take place at the end of each pass along a field.

However, there have been recent developments in which the packers remain coupled with the plough frame, but these are merely towed connections between the packer and the plough frame, and the packers are able to move up and down relative to the plough frame about their connections, and the soil crumbling action is derived solely from the mass of the packers, and the energy of the forward motion of the packers.

SUMMARY OF THE INVENTION

In a reversible plough according to the invention there is increased effectiveness of soil preparation devices, and more preferably packers, by providing a coupling arrangement whereby load transfer can take place from the plough frame to the packer during operation. This means that a lighter weight packer can be used in the invention, with the same degree of effectiveness as a heavier packer coupled via the known simple towed connections, or else for the same weight of the packer can be made more effective than in the known arrangement.

The coupling arrangement used to couple the soil preparation device, e.g. packer to the frame, of a reversible plough according to the invention is of such a type that during operation, load transfer can take place from the plough frame to the packer via the coupling arrangement, and in addition, the coupling arrangement includes a swivel joint which allows the plough frame to rotate relative to the packer, and which also is capable of lifting the packer from the ground, during each reversal of the plough bodies.

The packer therefore is able to be lifted from the ground during each plough reversal, and the plough frame rotates relative to the packer via the swivel joint. In addition, after lifting from the ground, the packer then is transferred laterally, and lowered to the ground upon completion of the reversal of the plough frame.

The invention is primarily concerned with a reversible plough of the type which allows a soil preparation device, e.g. a packer, to be coupled therewith via a coupling arrangement of the type just described, and seeks to extend the utilization of the plough so that it is capable of carrying out one or more additional soil treatment operations, when required, at the same time as ploughing operations are being carried out.

The invention therefore allows these advantages to be achieved with reversible ploughs (plus additional components) to be supplied as original equipment, but also allows existing customers having a reversible plough to be modified to accept these additional components.

Thus, in addition to the capability of carrying out soil preparation, e.g. with a packer, at the same time as ploughing is carried out—so that the soil can be made ready for a subsequent seeding operation after a single pass along a previously unploughed field, the invention also allows further soil treatment to take place (in addition to ploughing/soil preparation), namely seeding and/or application of fertilizer.

According to the invention, there is provided a reversible plough which is adapted to be mounted behind a propelling vehicle and which comprises:

a main beam;
coupling means at the forward end of the main beam to couple the plough to the rear of the propelling vehicle;
a carrying beam having pairs of plough bodies mounted along its length and pivotally connected to the main beam for movement between first and second ploughing positions, in one of which one of the plough body of each pair is in a ploughing position and in the other of which the other plough body of each pair is in the ploughing position;

a coupling beam secured to the carrying beam and projecting laterally therefrom in either ploughing position, said coupling beam being movable with the carrying beam during each pivotal adjustment of the carrying beam between the first and second ploughing positions;

a soil preparation device engageable with the soil turned-over by the plough bodies in order to prepare the soil to receive seed;

a swivel connection which mounts the soil preparation device on the coupling beam, in which the swivel connection (1) allows the soil preparation device to engage the ground in either ploughing position, (2) is effective to transfer load during operation from the plough to the soil preparation device to increase the effectiveness of the latter and (3) permits the soil preparation device to be lifted from the ground on one side of the main beam, to move laterally and then to be lowered to the ground on the other side of the main beam during each reversal of the plough bodies;

a hopper mounted, or adapted to be mounted at a fixed location relative to the plough/soil preparation device combination, and serving to store seed and/or fertilizer as the hopper contents;

a distributor mounted on the soil preparation device and arranged to distribute the hopper contents onto the ground in cooperation with the soil preparation action by the soil preparation device; and, a distribution line extending between the hopper and the distributor to supply the hopper contents thereto, said line being constructed and arranged to allow the hopper contents to be delivered to the distributor in each ploughing position, and also allowing the soil preparation device to move with the coupling beam during each reversal of the plough between the first and second ploughing positions.

The way in which the distribution line is constructed and arranged will depend upon the location and arrangement of the hopper, and by way of example, the line may be inherently flexible, or include flexible joints, or the line may be coupled with either or both of the hopper and the distributor via suitable flexible or universal type joints.

The invention therefore enables the reversible plough (1) to function simply to carry out ploughing operations only (with the soil preparation device uncoupled), (2) to carry out in a single pass both ploughing and soil preparation actions when the soil preparation device is coupled with it, and (3) to carry out in a single pass the additional step of seeding and/or fertilizer distribution.

In its simplest form, the invention comprises a reversible plough of the fully mounted or semi-mounted type, to which a single soil preparation device may be coupled, plus the hopper and distributor and distribution line, but in preferred development of the invention the plough may have a forward section which includes the main beam, and a rear section also having pairs of plough bodies and which is coupled to the rear of the forward section via an intermediate wheel-supported connecting frame, and the arrangement is such that both the forward and the rear section can be jointly actuated to move between the two ploughing positions.

A corresponding soil preparation device and distribution device may be coupled with each section, and a corresponding distribution line may extend from the hopper to each distributor.

Conveniently, the fixed location for the hopper is provided by a rigid mounting on a fixed part of the intermediate connecting frame. However, other fixed location may be provided for the hopper, such location being on a relatively fixed part of the propelling vehicle/plough combination, relative to the parts which move. By way of example only, the hopper may be mounted on the propelling vehicle and with suitable routing of the distribution line(s) from the hopper to the or each distributor.

The intermediate connecting frame has a fixed part supported by a wheel set, and preferably includes a connecting beam rigidly secured at its forward and rear ends to the rear of the forward section and the front of the rear section respectively, said connecting beam being mounted on a pivot carried by the fixed part of the frame and defining a pivot axis extending generally parallel to the ploughing direction and about which both the carrying beam of the forward section and also the connecting beam of the intermediate section plus the rear section can pivot jointly during each plough reversal.

The pivot member defines the pivot axis extending generally parallel to the ploughing direction, and may be carried by a transverse beam on which the wheel set is mounted. Each wheel may be independently adjusted, preferably by hydraulic cylinder, to vary the height and attitude of the transverse beam to suit ploughing conditions.

BRIEF DESCRIPTION OF THE DRAWINGS

Preferred embodiments of reversible plough according to the invention will now be described in detail, by way of example only, with reference to the accompanying drawings, in which.

DESCRIPTION OF THE PREFERRED EMBODIMENTS

Figure 1:
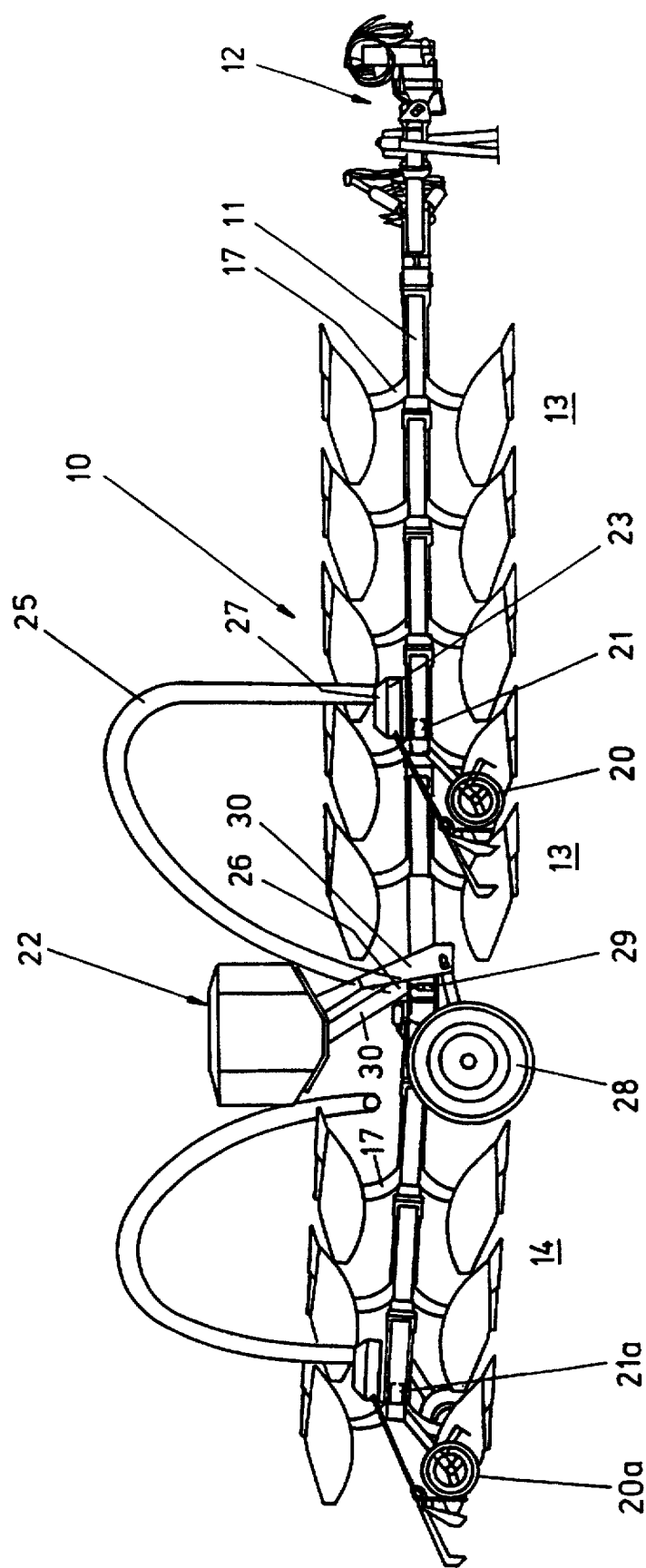
FIG. 1 is a side view of a semi-mounted reversible plough/soil preparation device comprising a first embodiment of combination according to the invention.
Figure 2:
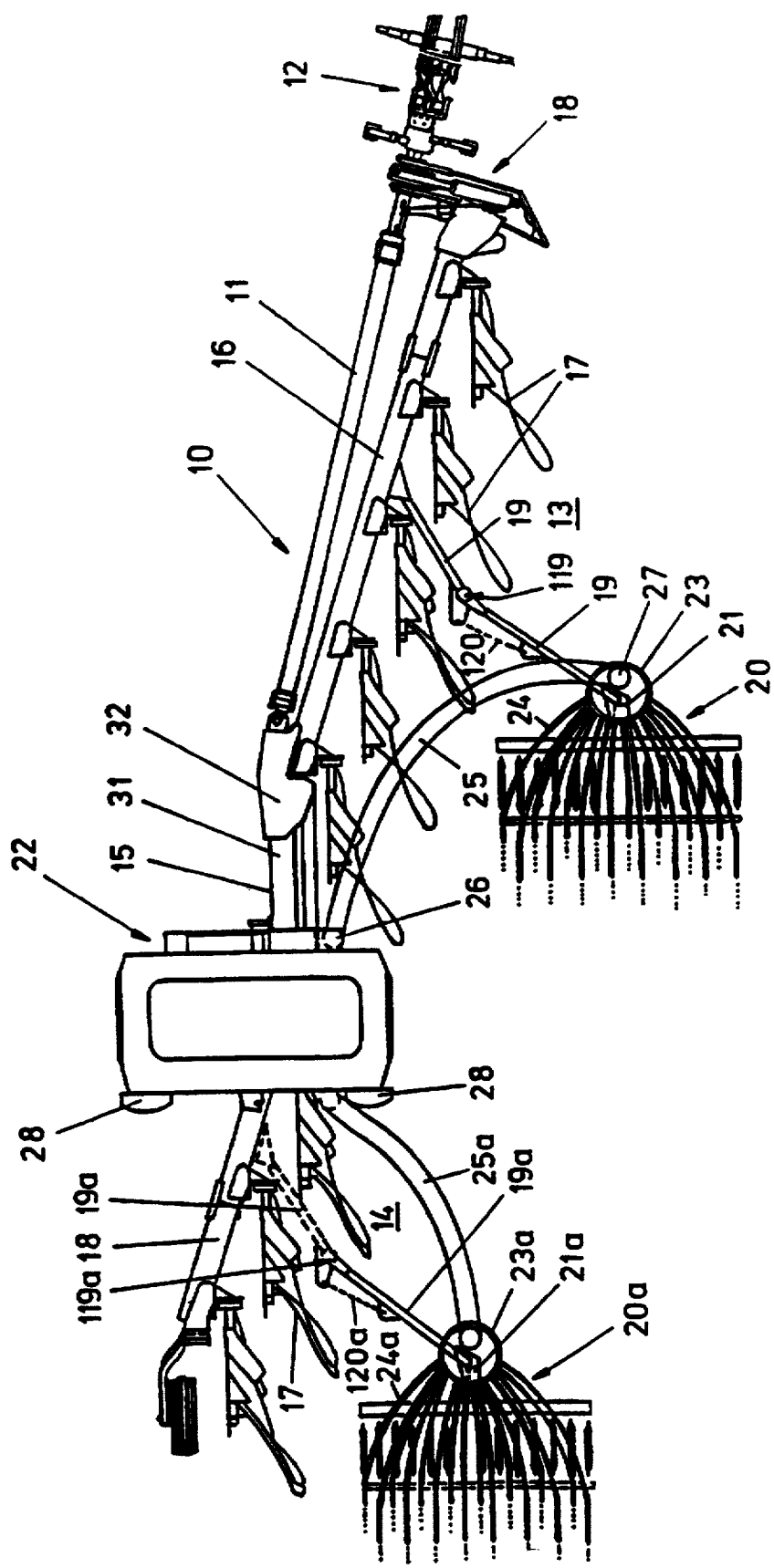
FIG. 2 is a plan view of the combination shown in FIG. 1.

The illustrated embodiment in FIGS. 1 and 2 is a semi-mounted plough/soil preparation device combination, but it should be understood that the main features of the invention may be applied also to a fully mounted plough. Further, while the embodiment has front and rear plough sections and associated soil preparation devices in the form of respective "packers," the invention is not restricted to use of packers and other types of soil preparation devices may be used, such as harrows and power harrows. Also, a single ploughing section may be provided, and single soil preparation device associated therewith. Alternatively, a single (large) soil preparation device may be used to work on soil turned over by a reversible plough having both front and rear ploughing sections (or indeed further ploughing sections if required).

Referring now to the drawings, a reversible plough/soil preparation device combination is designated generally by reference 10 and is adapted to be mounted behind a tractor or other propelling vehicle (not shown) in standard manner, and comprises a main beam 11 having coupling means 12 at the forward end of standard type to couple the plough in semi-mounted manner on usual lifting mechanism at the rear of a tractor.

The ploughing section of the combination is in fact in two parts, comprising a forward section 13, and a rear section 14, and interconnected via an intermediate connecting frame 15. The forward section 13 has a carrying beam 16 which is provided with pairs of reversible plough bodies 17 mounted along its length. Similar pairs of plough bodies 17 are mounted on a carrying beam 18 of the rear ploughing section 14.

The carrying beam 16 of the forward section 13 is pivotally connected to the main beam 11, and pivots under the actuation of hydraulic turn-over mechanism 18 between a first ploughing position in which one plough body of each pair is in the ploughing position, and a second position in which the other plough body of each pair is in the ploughing position. FIG. 2 shows in plan the plough bodies 17 arranged on the right hand side of the main beam 11, with respect to the ploughing direction, and the other ploughing position is obtained (not shown) by pivotable movement of carrying beam 16 and the plough bodies 17 through approximately 180° to bring what was previously the uppermost plough body of each pair to now be the lowermost plough body ready to carry out ploughing and to turn-over the soil in the opposite direction, ready for a return pass along a field.

A two-part coupling beam 19 is secured to the carrying beam 16 and projects laterally therefrom in either ploughing position, this coupling beam 19 being movable with the carrying beam 16 during each pivotable adjustment of the carrying beam 16 between the first and second ploughing positions.

A soil preparation device in the form of a packer 20 is engageable with the soil turned-over by the plough bodies, and in the illustrated arrangement packer 20 crumbles and otherwise prepares the soil which has previously been formed by some only of the plough bodies of the associated forward ploughing section 13, and also some of the furrows formed during a previous pass along the field.

The two parts of the coupling beam 19 are relatively adjustable in a horizontal plane via a pivotal joint 119 and adjustable turnbuckle or hydraulic cylinder shown schematically by reference 120. This allows lateral adjustment of packer 20 relative to the carrying beam 16.

A swivel connection designated generally by reference 21 mounts the packer 20 on the coupling beam 19, and the construction and arrangement of this connection 21 is such that: (1) it allows the packer 20 to engage the ground in either ploughing position; (2) it is effective to transfer load from the plough frame to the packer 20 during operation so as to increase the effectiveness of the packer 20; and (3) it permits the packer 20 to be lifted from the ground on one side of the main beam 11 (the right hand side as shown in FIG. 2), to move laterally and then to be lowered to the ground on the other side of the main beam 11 (the left hand side in FIG. 2 with respect to the direction of ploughing) during each reversal of the plough bodies.

The rear ploughing section 14 has a similar assembly of packer to the forward ploughing section 13, and corresponding parts are designated by the same reference numerals with the addition of the letter a.

With respect to the parts of the combination described so far, the plough/packer combination can be operated in order to carry out, in a single pass, both ploughing and soil preparation. However, if only ploughing is required, e.g. because of the season in which ploughing is carried out, the packers 20, 20a can be readily uncoupled, and the plough can then function solely as a reversible plough.

However, to extend the utilization of the plough/soil preparation combination, additional components may be incorporated in or with the combination, as will now be described in more detail below, and which enables seeding also to take place at the same time, or application of fertilizer. Alternatively, distribution of both seed and fertilizer could take place simultaneously if required.

To enable these additional operations to be carried out, a hopper is provided which is mounted, or adapted to be mounted at a suitable fixed location relative to the plough/ packer combination, and serves to store seed and/or fertilizer. In the illustrated embodiment, a hopper 22 is mounted on a fixed part of the plough frame, namely via a rigid mounting on a fixed part of the intermediate connecting frame 15. This is, however, merely one preferred location, and other locations may be provided, fixed relative to the tractor/plough combination, and which could include mounting directly on the tractor.

A distribution device 23 is mounted on the packer 20, and is arranged to distribute the hopper contents onto the ground in cooperation with the soil preparation action by the packer 20. The distribution device or distributor 23 may comprise any proprietary type of seed distributor currently available, although this is not essential to the invention. It is merely necessary for the distributor 23 to receive an air blown supply of seed (and/or fertilizer) and to distribute the material via feed tubes 24 or other suitable means to terminate close to the ground downstream of the packer, and usually followed (although not shown in detail) by any suitable fingers which help to cover up the seed with soil. The feed tubes 24 may be incorporated with "coulters" in known manner.

A distribution line 25 extends between the hopper 22 and the distributor 23 in order to supply the hopper contents thereto, and the construction and arrangement of the distribution line 25 is such that it allows the hopper contents to be delivered to the distributor 23 in each ploughing position, and also allows the packer 20 and distributor 23 to move with the coupling beam 19 and carrying beam 16 during each adjustment of the plough between the first and second ploughing positions.

The way in which the distribution line 25 is constructed and arranged will depend upon the location and arrangement of the hopper 22. In a particularly simple arrangement, the line 25 may be inherently flexible, and therefore allows the turning movement of the packer 20 and distributor 23. The line may include flexible joints, or may be coupled either at input end 26 to the hopper outlet, or at outlet end 27 to the distributor via flexible or "universal" type joints.

The hopper contents, e.g. seed and/or fertilizer, will normally fall under gravity into the base of the hopper, and a pneumatic delivery system is preferably built into the base of the hopper, to deliver the hopper contents along the distribution line 25 under air pressure. The distributor 23 and the pneumatic delivery system may comprise a proprietary system, such as that made by Accord.

Only a single distribution line 25 is shown leading to each distributor 23, but more than one line may be provided if two separate hopper contents are to be distributed, e.g. seed and fertilizer.

The combination of reversible plough/soil preparation device/seed and/or fertilizer distribution system therefore can function in any one or more of the following ways, as required:

1. To function simply as a reversible plough, with the packers 20, 20a uncoupled;
2. To carry out in a single pass both ploughing and soil preparation action when the packers 20, 20a are coupled with the plough frame; and
3. To carry out in a single pass the additional step of seeding and/or fertilizer distribution.

As shown in the drawing, the reversible plough comprises forward section 13 and rear section 14, as described above, and interconnected via intermediate connection frame 15, and which will now be described in more detail. The intermediate connecting frame 15 comprises a transverse fixed beam (not shown in detail) supported by a wheel set comprising a pair of laterally spaced support wheels 28, each of which is independently adjustable via a hydraulic depth control actuator 29, to vary the height and attitude of the transverse fixed beam. The hopper 22 is mounted rigidly on the fixed part of the intermediate connecting frame 15 via rigid supporting struts 30 which raise the main body of the hopper 22 by a sufficient amount to allow free movement of the movable parts, without obstruction, during each plough reversal operation.

The connecting frame 15 also includes a connecting beam 31 rigidly secured at its forward end 32 to the carrying beam 16 of the forward section 13, and via its rear end (not shown in detail) to the forward end of carrying beam 18 of the rear section 14. The connecting beam 31 is mounted on a pivot member (not shown) at its rear end (hidden behind the wheel 28 as viewed in FIG. 1), and which pivot member defines a pivot axis extending generally in the ploughing direction, and about which the carrying beam 16 of the forward section 13, the intermediate connecting beam 31 of intermediate frame section 15, and also rear section beam 18 can move jointly about during each plough reversal operation. The front end mounting of the main beam 11 and carrying beam 16 also defines part of the pivot axis about which the entire assembly can be rotated during plough reversal. The pivot member is carried by the transverse beam on which the wheel set is mounted, which beam effectively forms a rear axle. The pivot member is mounted below this axle, and the entire movable assembly of the combination can pivot through 180° about the pivot axis for plough reversal, and can also pivot through 90° from either ploughing position in order to take-up a transport position.

The transport position is not shown in the drawing, but when the assembly is adjusted to this position, the plough bodies of each pair will be located side by side and at the same level, with their support connections to the respective beam extending substantially horizontally, and in addition each packer 20, 20a will be hanging downwardly under gravity from the respective coupling beam 19, 19a, and which is permitted by the swivel connectors 21, 21a, whereby the packers are raised above the ground, and hang with the wheels of the packer extending substantially horizontally, and with clearance above the associated carrying beam 16 for front section 13, and carrying beam 18 for rear section 14.

FIGS. 1 and 2 illustrate a semi-mounted reversible plough/packer combination and seeding unit, and FIGS. 3 and 4, which will now be described, comprise a fully mounted reversible plough/packer (seed preparation device) combination and seeding unit to which the invention may be applied.

Figure 3:
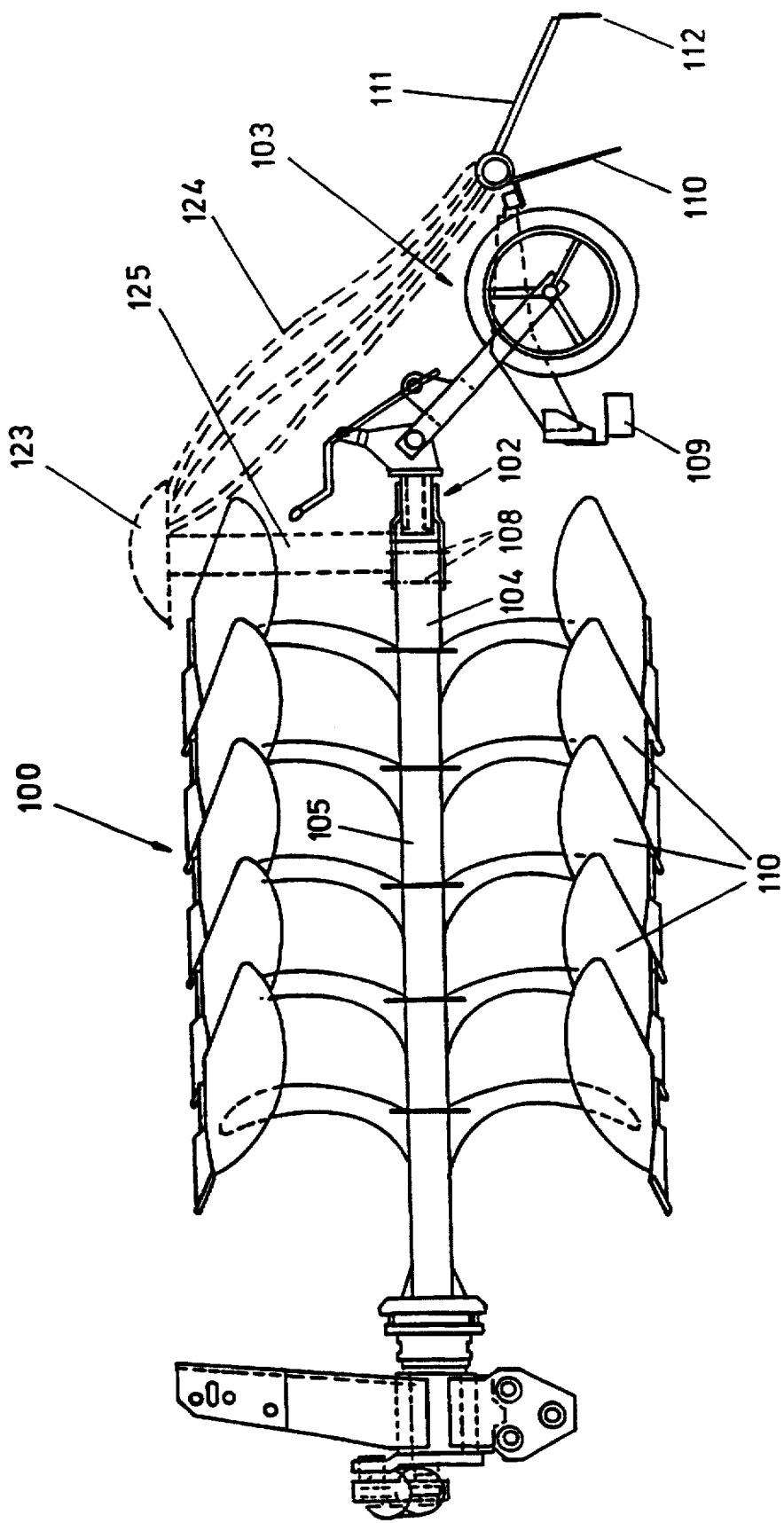
FIG. 3 is a side view of a fully mounted reversible plough/soil preparation device comprising a second embodiment of combination according to the invention.
Figure 4:
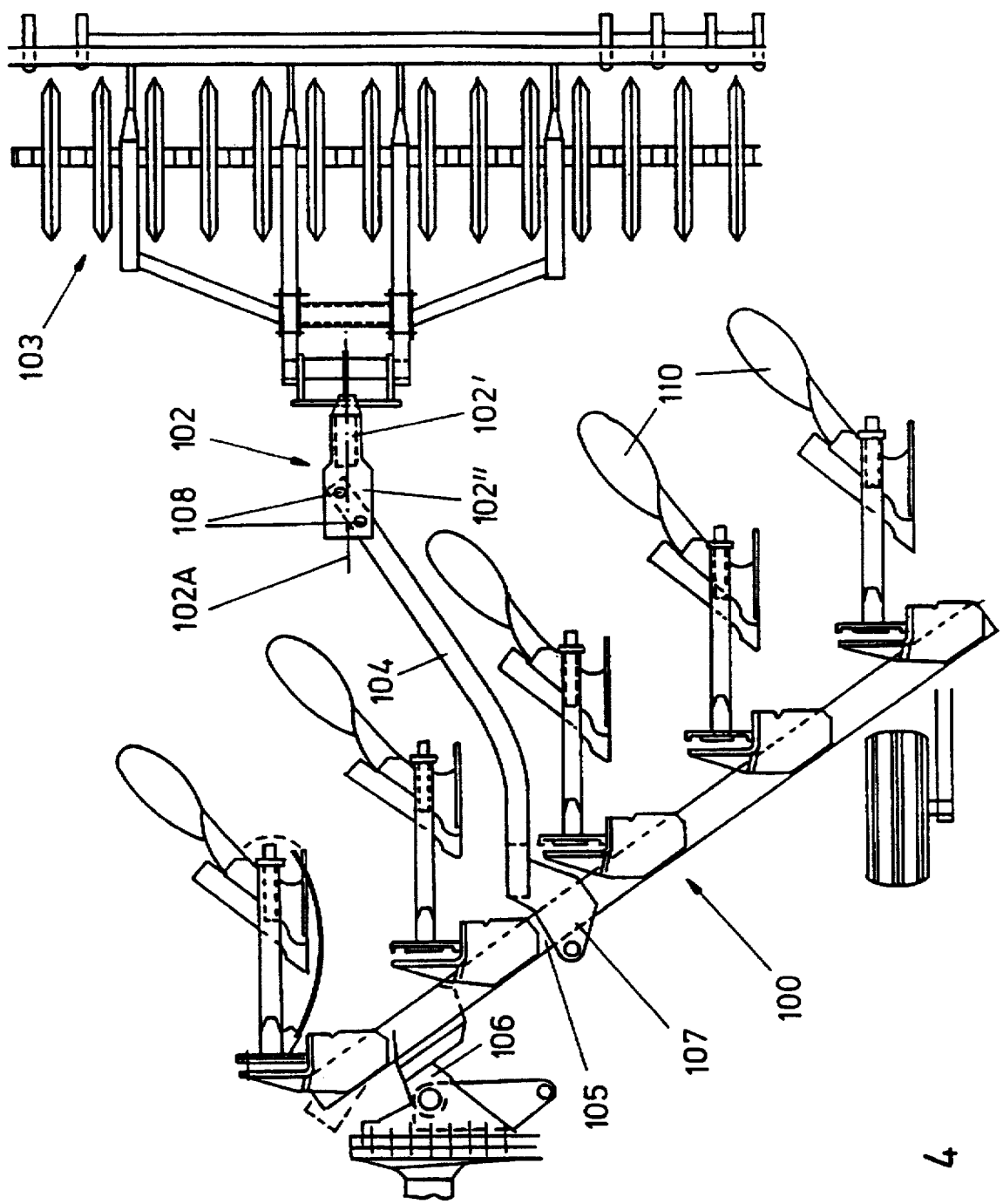
FIG. 4 is a plan view of the combination shown in FIG. 3.

Referring now to FIGS. 3 and 4, a fully mounted reversible plough is shown, which is designated generally by reference 100. This is mounted on the rear lifting hitch of a tractor (not shown) in the usual way, so as to function as a fully mounted plough. The forward mounting components of the plough 100 may be of conventional construction, and will not be described in detail. The plough 100 has a plough frame 105 connected at its forward end 106 to the lifting hitch of the tractor, and which can be adjusted between either one of two reversible plough positions using standard components. Usual pairs of reversible plough bodies 110 are mounted on the plough frame 105.

Along the length of the plough frame 105, there is a rigid mounting bracket 107 which carries rigidly a connecting arm 104 which extends rearwardly therefrom and which serves to mount a packer 103 (seed preparation device) on the plough frame 105. Packer 103 is mounted on a trailing end of arm 104 via a swivel coupling 102 which allows the packer 103 to rotate about longitudinal axis 102A during ploughing operations, and also during plough body reversal. The swivel coupling 102 is sufficiently robust that it can effect lifting of the packer 103 upwardly from the ground surface during each plough body reversal, and in which plough frame 105 will usually be lifted upwardly to raise the plough bodies 110 from the ground, and then plough frame 105 is rotated about a generally horizontal axis in order to reverse the plough bodies. During this movement of the plough frame 105, this is followed by the coupling arm 104, and therefore also by the packer 103 via the swivel coupling 102.

The swivel coupling 102 therefore comprises a sleeve part 102' and a pin or bolt part 102" which is rotatably mounted within sleeve part 102', but is axially located within the sleeve part.

The sleeve part 102' is rigidly connected to the rear end of arm 104 via anchor bolts 108.

The packer shown in FIGS. 3 and 4 has a board 109 and a number of finger harrows 110.

The combination shown in FIGS. 3 and 4 therefore is a fully mounted combination, and at the end of ploughing of each row of furrows, the plough 100 and the packer 103 are lifted from the ground, and the plough bodies are then reversed. During this adjustment, the packer 103 is not reversed, by virtue of the swivel coupling 102 which allows the packer 103 to be suspended in the same position during plough body reversal.

The fully mounted reversible plough/packer combination shown in FIGS. 3 and 4 may be provided with a seeding unit, in generally similar manner to that described above with reference to the embodiment shown in FIGS. 1 and 2, and this comprises a distribution device 123 (shown in dashed outline in FIG. 3) which is mounted on the packer 103, or on the swivel coupling 102, the arm 104, or any other convenient position, and which receives a supply of seed from a hopper (not shown) and distributes the seed via flexible distribution lines (shown schematically by reference 124 in FIG. 3) so as to cooperate with trailing fingers 111 and to be distributed into the prepared soil. The lines 124 are flexible lines which run from the distribution device 123 to suitable mounting points on the packer 103 (not shown in detail) and may then run along passages defined in the fingers 111 so as to be capable of being distributed from the lower ends 112 thereof.

The distribution device 123 is carried at the upper end of a rigid mounting and supply tube 125, extending upwardly from swivel coupling 102 as shown in FIG. 3, and distribution device 123 and supply/mounting tube 125 move together with the coupling 102 during each plough body reversal.

Distribution device 123 and its related components are shown schematically in FIG. 3 only, but are not shown in FIG. 4. At the lower end of the mounting/supply tube 125, an inlet coupling is provided (not shown) to which a supply tube running from the hopper is coupled, in order to distribute the seed form the hopper to the inlet coupling.

In the embodiment shown in FIGS. 1 and 2, a hopper is mounted on an intermediate frame section of a two part reversible plough frame, and for the fully mounted embodiment of FIGS. 3 and 4, the hopper can be mounted at any convenient position, preferably one which is fixed relative to the combination, or to the propelling vehicle.

Figure 5:
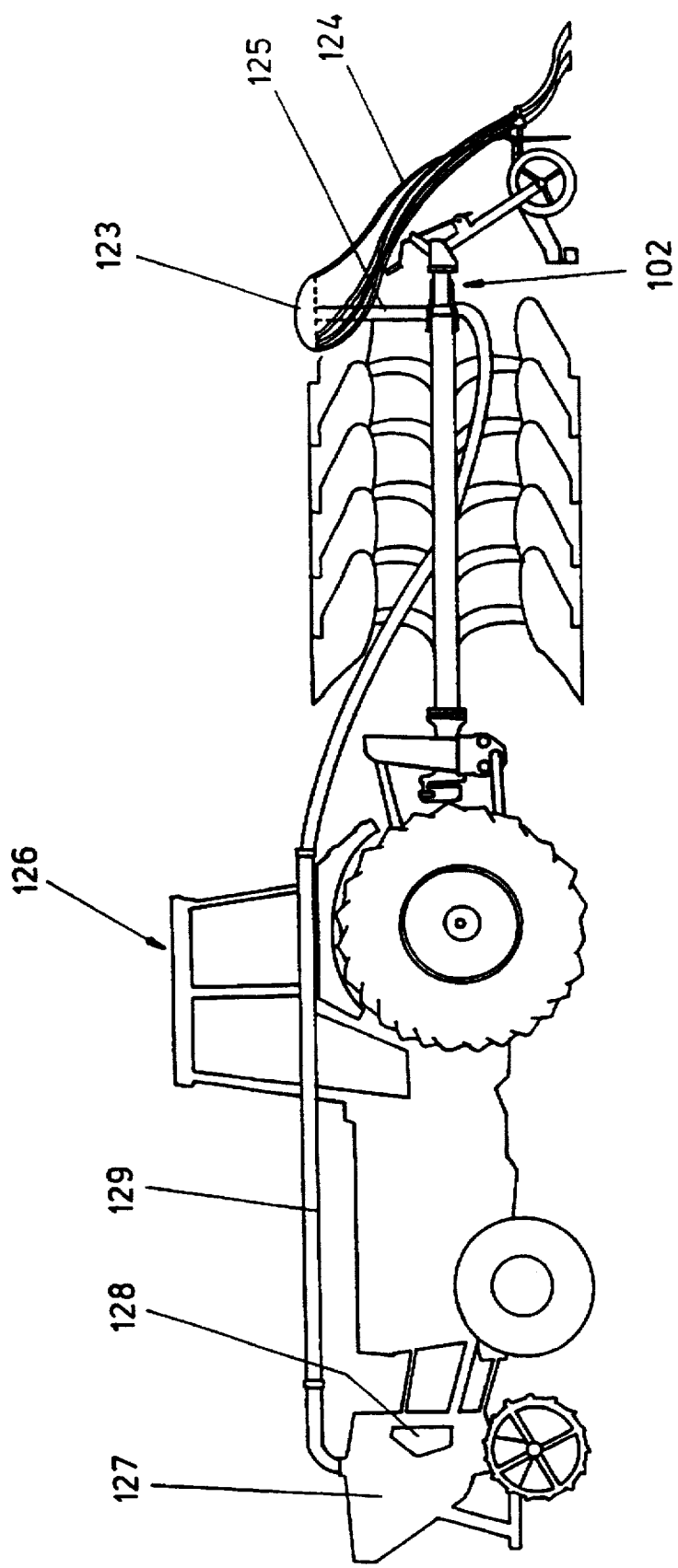
FIG. 5 is a schematic side view of a third embodiment and comprising a modification of FIGS. 3 and 4.

In a particularly preferred arrangement, a hopper is mounted at the front end of the tractor, and this is shown schematically in FIG. 5. This shows a tractor 126 on the front of which is mounted a wheel-supported hopper 127 having mounted thereon an air driven seed distributor 128, and which delivers seed rearwardly to the base of mounting/ supply tube 125 via a flexible hose 129 which extends rearwardly from the hopper 127 and over the body of the tractor 126, before being taken downwardly to the base of tube 125. The routing of hose 129 will be controlled in such a way as that it will not interfere with the movements of the component parts of the combination, during normal ploughing, and during plough body reversal. The inherent flexibility of hose 129 allows the seed distribution 123 and tube 125 to move with the swivel coupling 102 during plough body reversal, and this may be provided for by the inherent flexibility of the hose 129 and/or by the provision of a flexible coupling joint or section to the tube 125.

FIG. 5 is a schematic illustration only, and the component parts of the fully mounted reversible plough and the packer are shown in FIGS. 3 and 4. The further embodiments shown in FIGS. 3 to 5 illustrate that the invention may be applied to a fully mounted reversible plough/seed preparation device combination, and in which the seed distribution arrangement allows movement of the component parts of the combination, during normal ploughing, and during plough body reversal, and therefore a reversible plough can operate, in conjunction with seed bed preparation, and seeding, in a single pass operation, and also with plough body reversal capability.

The front mounting of the hopper 127 is an advantageous further development, used in conjunction with a fully mounted reversible plough shown in FIGS. 3 and 4.

The invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed is:

1. A reversible plough adapted to be mounted behind a propelling vehicle with a front and a rear, said plough comprising:
   (a) a main beam having a forward end;
   (b) coupling means at said forward end of said main beam for coupling the plough to the rear of the propelling vehicle;
   (c) a carrying beam pivotally connected to said main beam for movement between a first ploughing position and a second ploughing position, said carrying beam having a forward end and a rear end;
   (d) a plurality of pairs of plough bodies mounted along the length of said carrying beam and pivotally moveable with said carrying beam, whereby one plough body of each of said pairs of plough bodies takes up a ploughing position in said first ploughing position of said carrying beam, and said other plough body of each of said pairs of plough bodies takes up a ploughing position in said second ploughing position of said carrying beam;
   (e) a soil preparation device engageable with the soil turned-over by said plough bodies, thereby to prepare the soil to receive seed;
   (f) a coupling beam mounting said soil preparation device on the plough, said coupling beam being moveable with said carrying beam during each pivotable adjustment of said carrying beam between said first ploughing position and said second ploughing position;
   (g) a swivel connection mounting said soil preparation device on said coupling beam, said swivel connection being operative:
      (i) to allow said soil preparation device to engage the ground in either said first ploughing position or said second ploughing position of said carrying beam;
      (ii) to transmit load during operation from the plough to said soil preparation device, thereby increasing the effectiveness thereof; and
      (iii) to permit said soil preparation device during each reversal of said pair of plough bodies to be lifted from the ground on one side of said main beam, to move laterally, and then to be lowered to the ground on the other side of said main beam;
   (h) a hopper mounted at a fixed location relative to the combination of the plough and said soil preparation device and for storing at least one of seed and fertilizer;
   (i) a distributor mounted on said soil preparation device and arranged to distribute the contents of said hopper on the ground in cooperation with the soil preparation action of said soil preparation device; and
   (j) a distribution line extending between said hopper and said distributor, said distribution line being so constructed and arranged as to allow the contents of said hopper to be delivered to said distributor in said first ploughing position or said second ploughing position, and said soil preparation device moving with said coupling beam and said carrying beam during pivotable adjustment between said first ploughing position and said second ploughing position.

2. A reversible plough as recited in claim 1, wherein said coupling beam is secured to said carrying beam and projects laterally therefrom in either of said first ploughing position or said second ploughing position.

3. A reversible plough as recited in claim 1, wherein said distribution line is inherently flexible, thereby permitting movement of the plough between said first ploughing position and said second ploughing position.

4. A reversible plough as recited in claim 1, wherein said distribution line includes flexible joints, thereby to permit movement of the plough between said first ploughing position and said second ploughing position.

5. A reversible plough as recited in claim 1, further comprising a universal joint arranged at at least one end of said distribution line, coupling said distribution line with one of said hopper and said distributor.

6. A reversible plough as recited in claim 1, wherein said reversible plough comprises a semi-mounted plough.

7. A reversible plough as recited in claim 6, further comprising:
   (a) a forward ploughing section in which said main beam and said carrying beam are mounted;
   (b) a rear ploughing section; and
   (c) an intermediate connecting frame connecting said rear ploughing section to said forward ploughing section.

8. A reversible plough as recited in claim 7, further comprising:

(a) a further carrying beam;

(b) a coupling beam; and (c) a swivel connection, said further carrying beam, said coupling beam, and said swivel connection together mounting a further soil preparation device on said rear ploughing section.

9. A reversible plough as recited in claim 8, further comprising a wheel set supporting said intermediate connecting frame.

10. A reversible plough as recited in claim 9, further comprising:

(a) a fixed frame on which said wheel set is mounted; and (b) a pivot member carried by said fixed frame and defining a pivot axis extending generally in the ploughing direction of said forward ploughing section, said carrying beam of said rear ploughing section being pivoted about said pivot axis during each reversal of said pair of plough bodies.

11. A reversible plough as recited in claim 9, further comprising a connecting beam having a forward end and a rearward end, said connecting beam rigidly secured at said forward end thereof to said rear end of said carrying beam of said forward ploughing section, said beam further being secured at said rearward end thereof to said forward end of said carrying beam of said rear ploughing section, said connecting beam being pivotable about said pivot axis with said carrying beam of said forward ploughing section and said carrying beam of said rear ploughing section.

12. A reversible plough as recited in claim 7, wherein said hopper is rigidly mounted on said intermediate connecting frame.

13. A reversible plough as recited in claim 1, wherein said reversible plough comprises a fully mounted plough.

14. A reversible plough as recited in claim 1, further comprising:

(a) two distributors; and (b) separate distribution lines extending between said hopper and each of said distributors.

15. A reversible plough as recited in claim 1, wherein:

(a) said distributor comprises coulters having ground engaging ends; and (b) a feed tube incorporated in said ground engaging ends.

16. A reversible plough as recited in claim 12, further comprising:

(a) a rigid coupling arm; and (b) a swivel coupling mounting said soil preparation device on the plough.

17. A reversible plough as recited in claim 15, wherein said distributor is carried by said coupling arm.

18. A reversible plough as recited in claim 1, wherein said hopper is mounted at the front of the propelling vehicle, and said plough further comprises a flexible hose to be extended over and alongside the propelling vehicle to connect said hopper to said distributor.

* * * * *